United States Patent [19]

Kervistin

[11] Patent Number: 4,730,982
[45] Date of Patent: Mar. 15, 1988

[54] ASSEMBLY FOR CONTROLLING THE FLOW OF COOLING AIR IN AN ENGINE TURBINE

[75] Inventor: Robert Kervistin, Le Mee sur Seine, France

[73] Assignee: Societe Nationale d'Etude et de Construction de Moteurs D'Aviation "S.N.E.C.M.A.", Paris, France

[21] Appl. No.: 63,075

[22] Filed: Jun. 17, 1987

[30] Foreign Application Priority Data

Jun. 18, 1986 [FR] France ............................ 86 08776

[51] Int. Cl.$^4$ ........................... F01D 5/18; F01D 5/08
[52] U.S. Cl. ........................................ 416/95; 416/39; 416/198 A; 415/115
[58] Field of Search .......... 416/39, 95, 198 A, 200 A, 416/201 R; 415/115, 47, 48, 199.5

[56] References Cited

U.S. PATENT DOCUMENTS

| | | | |
|---|---|---|---|
| 2,656,147 | 10/1953 | Brownhill et al. | 416/198 A X |
| 2,807,434 | 9/1957 | Zimmerman | 416/95 X |
| 2,906,494 | 9/1959 | McCarthy et al. | 416/39 X |
| 3,056,579 | 10/1962 | Bobo | 416/198 A X |
| 3,575,528 | 4/1971 | Beam et al. | 416/95 X |
| 3,736,069 | 5/1973 | Beam et al. | 416/95 X |
| 3,972,181 | 8/1976 | Swayne | 416/95 X |
| 3,975,901 | 8/1976 | Hallinger et al. | 415/115 X |
| 4,645,424 | 2/1987 | Peters | 416/95 X |

FOREIGN PATENT DOCUMENTS

| | | |
|---|---|---|
| 0144842 | 6/1985 | European Pat. Off. |
| 2214044 | 8/1974 | France |
| 311370 | 1/1956 | Switzerland |
| 988541 | 4/1965 | United Kingdom ................. 416/95 |
| 1484288 | 9/1977 | United Kingdom |
| 2111598 | 7/1983 | United Kingdom |
| 2137283 | 10/1984 | United Kingdom |
| 2151715 | 7/1985 | United Kingdom |

Primary Examiner—Everette A. Powell, Jr.
Attorney, Agent, or Firm—Oblon, Fisher, Spivak, McClelland & Maier

[57] ABSTRACT

A blade root sockets provided in the discs of a turbine rotor have passages for cooling air which are arranged to be variably blocked by closure means carried by the upstream and downstream ends of the labyrinth carriers disposed between the discs. The labyrinth carriers are of the pin-like type and are able to expand and contract in response to the temperature of the gas flow passing through the turbine, moving the closure means to open or close the passages. The positions of the closure means adjacent the passages are determined by the relative dimensions and the thermal expansion coefficients of the discs and the labyrinth carriers, and may be chosen to provide full cooling air flow during engine acceleration, a reduced flow during stable operation, and a very restricted flow to the first disc only during deceleration.

5 Claims, 3 Drawing Figures

ASSEMBLY FOR CONTROLLING THE FLOW OF COOLING AIR IN AN ENGINE TURBINE

BACKGROUND OF THE INVENTION

1. Field of the Invention

The invention relates to an engine turbine, and in particular to an assembly for controlling the flows of cooling air through the bottoms of the blade root sockets in the discs of a turbine rotor.

2. Summary of the Prior Art

The turbines of an aircraft engine generally comprise several stages of blades some of which have the blade root sockets arranged to be cooled by a flow of air taken from the compressor, and in order to reduce the amount of air taken from the compressor the cooling is effected in cascade fashion. Thus, only the first stage is cooled by the air coming directly from the compressor, the following stages being cooled by the air having already circulated in the preceding stage or stages.

The flow of air taken is designed to effect cooling under the severest operating conditions, such as during take-off, when there is experienced the highest engine loading and the greatest thermal gradients.

During the other phases of flight: i.e. cruising, idling, and approach, some stages can do without cooling. Accordingly, attempts have been made to achieve automatic control of the cooling air flows by making use of the dimensional variations of certain elements of the turbine when subjected to the variations in temperature of the gas flow passing through the blades.

For example, U.S. Pat. No. 3,975,901 discloses a device for controlling the clearance between a sealing ring and the ends of the rotor blades by cooling the ring with a gas flow of which the temperature and the rate of flow may be varied. This gas flow is obtained by mixing cold air taken from the compressor with hot gases taken from the exhaust duct from the combustion chamber. the cold air and the hot gases flow into two separate chambers each of which is provided in a radial wall with a circular row of openings. A disc co-operates with the radial wall and has two rows of openings of which at least one co-operates with one of the rows of openings in the radial wall. The disc also has, on its inside edge, a shoulder which is disposed adjacent the flow of the combustion gases passing through the blades. Temperature variations of the combustion gases produce dimensional variations of the ring which bring the rows of openings in the disc into complete or partial registry with the rows of openings of the chambers, thereby allowing a greater or lesser flow of cold air and hot gases into a mixing chamber which supplies the ring cooling circuit.

GB Pat. No. 1 484 288 is also concerned with a device for controlling the clearances of a sealing ring, the device utilising the intake of air from the high pressure compressor into two concentric chambers formed in the sealing ring. The ring is held by a resilient support inside a concentric member which is of relatively substantial mass and which forms, with the outer wall of the ring, a chamber which is also supplied by air from the high pressure compressor, this air being supplied through an annular passage which is closable in response to differential expansion of the member and of the ring.

The present invention is based on the same principle of controlling the intake of cooling air by varying closure of air passages by the expansion of an element subjected to the temperature variations of the gas flow passing through the blades of the turbine.

SUMMARY OF THE INVENTION

According to the invention there is provided an engine turbine comprising turbine rotor discs, sockets in the outer peripheries of said discs, turbine rotor blades mounted on said discs with root portions of said blades in said sockets, cooling passages at the bottom of said sockets for the flow of cooling air therethrough, and labyrinth carriers separating said discs, an assembly for controlling the flow of cooling air through said passages comprising annular closure means at the upstream and downstream ends of said labyrinth carriers adapted to block or unblock said cooling passages in response to differential radial expansion of said discs and said labyrinth carriers, blocking of said passages being determined by the positions of said closure means and of said passages, which positions are in turn determined by the dimensions and thermal expansion coefficients of said discs and said labyrinth carriers.

DESCRIPTION OF THE PREFERRED EMBODIMENT

Figure 1:
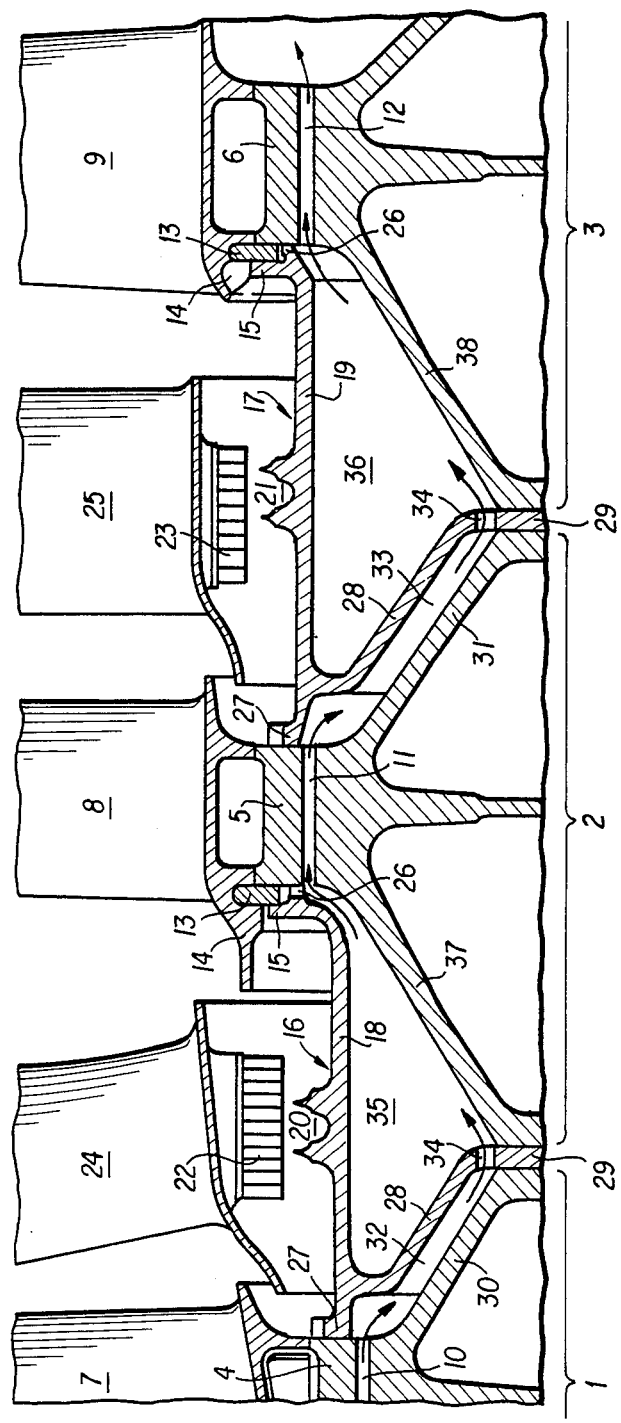
FIG. 1 is a diagrammatic half-axial sectional view of part of a low pressure turbine comprising one embodiment of an assembly in accordance with the invention, showing the assembly in a configuration adopted during engine acceleration.

FIG. 1 shows part of the first three stages of a low pressure turbine of an aircraft engine, in which turbine discs 1,2,3 are provided, in known manner, with sockets around their outer peripheries for housing the roots 4,5,6 of the turbine blades 7,8,9. Passages 10,11,12 are formed between the bottoms of the sockets and the lower ends of the blade roots for circulation of cooling air from the compressor.

The blade roots are held in the sockets on the upstream side by annular washers 13 co-operating with grooves in the platforms 14 of the blades and, in the embodiment illustrated, by peripheral collars 15 provided at the downstream ends of labyrinth carriers 16,17 respectively disposed between the discs 1,2 and 2,3. These labyrinth carriers are each pin-shaped and comprise an outer cylindrical portion 18,19 supporting centrally on its outer surface the labyrinth members 20,21 which co-operate with the sealing ring 22,23 provided at the inner end of the stator blades 24,25. At its downstreeam end the outer cylindrical portion 18,19 supports annular closure means constituted by the outwardly projecting peripheral collar 15 having on its downstream face an annular shoulder 26 which faces downstream and engages at least the lower parts of the blade roots and the sockets in which the cooling passages 11,12 are provided in a manner such that it is able to block the passages more or less completely as will be explained later. At its upstream end, the outer cylindrical portion 18,19 supports further annular closure means constituted by an outwardly projecting peripheral support collar 27 engaging at least the bottom parts of the blade roots so that it prevents their axial displacement and is also able to block more or less completely the cooling passages 10,11 as will be explained below.

On the inner surface of the cylindrical portion 18,19 near its upstream end the labyrinth carrier 16,17 comprises a supporting wall 28 of frusto-conical shape having its free inner end extending radially inwards to form a ring 29 which is fixed on the rotor formed by the frusto-conical sides of the discs 1,2,3. Between the supporting wall 28 and the side 30,31 of the adjacent disc 1,2 there is a space 32,33 which communicates, through openings 34 provided in the wall 28 in the vicinity of the junction between its frusto-conical part and the ring part 29, with a chamber 35,36 bounded by the supporting wall 28, the cylindrical part 18,19 of the labyrinth carrier, and the frusto-conical wall 37,38 of the disc 2,3.

In a simpler embodiment which is not illustrated, the downstream and upstream closure means may be formed by similar support collars.

In the configuration shown in FIG. 1, the cooling air taken from the compressor freely enters the passage 10 for cooling the sockets of the first disc 1, passes out through the orifice defined by the outlet of the passage 10 and the support collar 27 of the first labyrinth carrier 16, makes its way through the space 32 into the chamber 35 formed between the first and second discs 1 and 2, enters the passage 11 through the orifice defined by the shoulder 26 of the first labyrinth carrier 16 and the inlet opening of the passage 11 to cool the sockets of the second disc 2, passes out through the orifice defined by the outlet of the passage 11 and the support collar 27 of the second labyrinth carrier 17, continues through the space 33 into the chamber 36 formed between the second and third discs 2 and 3, enters the passage 12 through the orifice defined by the shoulder 26 of the second labyrinth carrier 17 and the inlet of the passage 12 to cool the sockets of the third disc 3, and escapes freely from the passage 12, for example, into the gas flow passing through the turbine.

This configuration permits the full flow of cooling air and is created in the acceleration phase for which the engine loading is highest and the thermal gradients are the greatest, and thus makes it possible to maintain acceptable disc temperatures.

During acceleration, the rapid change in temperature of the gas stream passing through the turbine heats up the parts in contact with the gas stream, the heating being faster for the parts with smaller mass.

As the labyrinth carriers necessarily have a smaller mass than the discs, their thermal inertia is lower and their faster heating will cause them to expand faster, at least in a radial direction, with the result that the passages 10,11,12 are opened to their maximum programmed flow cross-section. These sections are defined by the relative positions of the collars and shoulders of the labyrinth carriers and of the passages provided in the sockets of the discs.

Figure 2:
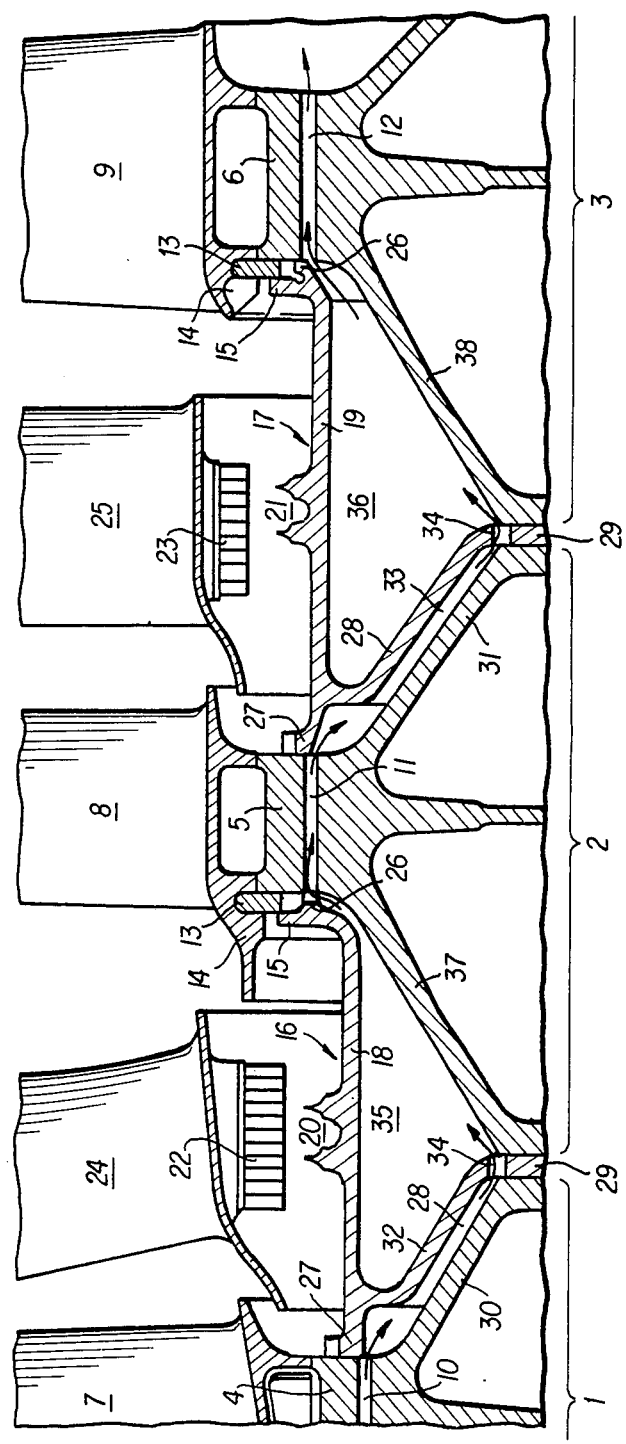
FIG. 2 is a view similar to FIG. 1, but showing a configuration adopted by the assembly during stable engine operation.
Figure 3:
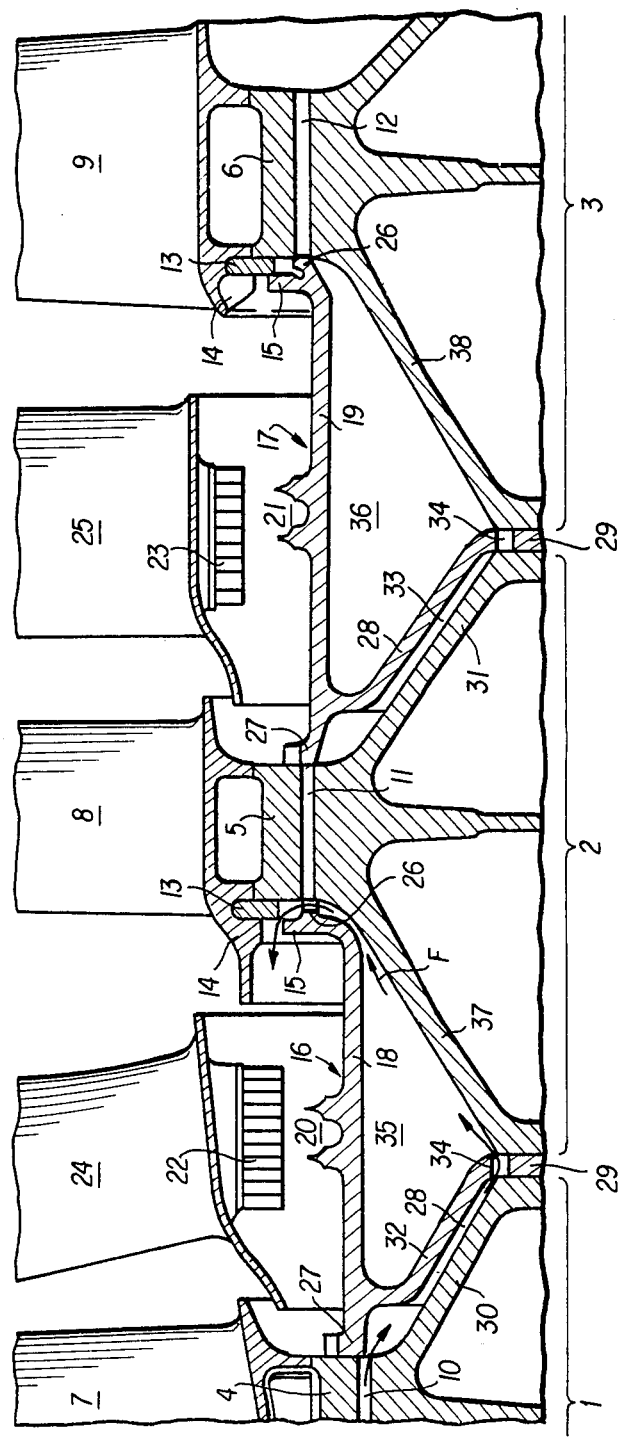
FIG. 3 is a further view similar to FIG. 1, but showing a configuration adopted by the assembly during engine deceleration.

The positions are determined by the dimensions as well as by the respective thermal expansion coefficients of the discs and labyrinth carriers, so that the differential mechanical and thermal expansions of these elements enable them to assume positions such that, depending on the operation of the engine, the cooling air can:

pass through the sockets of the three discs at a maximum rate of flow (FIG. 1); or act on the three discs at a reduced flow rate (FIG. 2); or act only on the first disc, the inlets and/or the exits of the socket cooling passages of the following discs being fully closed (FIG. 3).

FIG. 2 shows the configuration of the cooling assembly in a "stablised" engine rating. The temperature of the gas stream through the turbine is lower than that in the acceleration phase, and it follows from this that the discs need less cooling and therefore require a smaller flow of cooling air. The temperatures being lower, the expansion of the labyrinth carriers is smaller and the shoulders 26 and collars 27 that they carry are closer to the shaft so that they partly close the passages 10,11,12 to an extent depending on the temperature of the gases.

FIG. 3 shows the configuration of the cooling assembly during engine deceleration. In contrast to the acceleration phase, the labyrinth carriers cool down faster than the discs, and, in the present embodiment, the labyrinth carrier 17 is designed to contract so that its support collar 27 and its shoulder 26 respectively close fully the outlet of the passage 11 of the second disc 2 and the inlet to the passage 12 of the third disc 3. The support collar 27 and the shoulder 26 of the labyrinth carrier 16, on the other hand, do not completely close the exit of passage 10 in the first disc and the inlet to passage 11 in the second disc. Cooling of the bottoms of the sockets is therefore suppressed as, even in the first passage 10, the flow of air will be considerably reduced as a result of the closure of the exit from the passage 11 of the second disc. Accordingly, the temperature of the discs 1,2,3 at the bottoms of the sockets will fall less rapidly than otherwise would be the case during the "deceleration" phase. This situation is particularly advantageous as it avoids an inversion of gradient between the center of the disc and the bottom of the sockets, such inversion being particularly harmful to the life of the disc.

However, the chamber 35 is still supplied with air through the passage 10, the space 32, and the openings 34. Overpressure in the chamber 35 is prevented by a calibrated leakage flow between the shoulder 26 of the collar 15 and the upstream face of the sockets of the disc 2, and between the outer part of the collar 15 and the inner portion of the annular washer 13, as indicated by arrow F in FIG. 3. This leakage flow promotes equilibrium between the pressures acting on the inner and outer walls of the labyrinth carrier 16, thus regulating the cooling air flow in the region of the passage 10, as a pressure rise in the chamber 35 acts in a direction to expand the labyrinth carrier 16 and thus to increase the opening of the passage 10.

What is claimed is:

1. In an engine turbine comprising
   turbine rotor discs having sockets in the outer peripheries thereof,
   turbine rotor blades mounted on said discs with root portions of said blades in said sockets,
   cooling passages at the bottom of said sockets for the flow of cooling air therethrough,
   labyrinth carriers separating said discs, and
   an assembly for controlling the flow of cooling air through said passages comprising
      annular closure means at the upstream and downstream ends of said labyrinth carriers adapted selectively to block and unblock said cooling passages in response to differential radial expansion of said discs and said labyrinth carriers,
      blocking of said passages being determined by the positions of said closure means and of said passages, which positions are in turn determined by the dimensions and thermal expansion coefficients of said discs and said labyrinth carriers.

2. A control assembly in an engine turbine according to claim 1, wherein each of said labyrinth carriers has a pin-like profile and comprises a cylindrical outer part carrying labyrinth members, a frusto-conical supporting wall extending inwardly from one end of said outer part, and a radially inwardly extending annular portion at the inner end of said supporting wall for attachment to said turbine rotor discs, and said annular closure means at at least one end of each of said labyrinth carriers comprises a peripheral support collar disposed on said outer part at the end thereof and adapted to bear at least partly against part of said blade roots of the adjacent disc to prevent axial displacement of said roots and to block or partly block said cooling passage of said adjacent disc.

3. A control assembly in an engine turbine according to claim 2, wherein said annular closure means at said downstream end of each of said labyrinth carriers comprises a peripheral collar disposed on said outer part at the downstream end thereof, and an annular shoulder provided on the downstream face of said collar and adapted to bear against part of the adjacent disc and said blade roots thereof to block or partly block said cooling passage of said adjacent disc.

4. A control assembly in a turbine according to claim 3, wherein said supporting wall of each of said labyrinth carriers defines a space with said disc upstream thereof, and defines a chamber with said disc downstream thereof and with said outer part, said cooling passage of said upstream disc opening into one end of said space, said supporting wall including openings communicating the other end of said space with said chamber, and said chamber communicating with the cooling passage of said downstream disc.

5. A control assembly in a turbine according to claim 4, wherein said assembly is associated with the first three stages of a low pressure turbine of said engine, and said cooling air is taken from the compressor of said engine, said assembly being operative such that, when said annular closure means do not fully block said cooling passages, said cooling air enters the cooling passage of the first disc, exits through the opening defined between the outlet of said passage and said peripheral support collar of the first labyrinth carrier, undergoes expansion in said space and said chamber formed between said first and second discs, enters the opening defined between said annular shoulder of said first labyrinth carrier and the inlet of said cooling passage of said second disc, exits through the opening defined between the outlet of said second disc cooling passage and said peripheral support collar of the second labyrinth carrier, undergoes expansion in said space and said chamber formed between said second and third discs, enters the opening defined between said annular shoulder of said second labyrinth carrier and the inlet of said cooling passage of said third disc, and escapes freely from the outlet of said third disc cooling passage.

* * * * *